United States Patent

[11] 3,594,542

[72] Inventors Miyao Nobuaki
 Osaka Prefecture;
 Makoto Shiraki, Osaka Prefecture;
 Kunihiro Kosuge, Osaka Prefecture;
 Yukihiro Nanba, Osaka Prefecture; Saijiro Yoshida, Osaka Prefecture; Tatsuo Nakamura, Hyogo Prefecture; Takamichi Uehara, Hyogo Prefecture; Kazushige Matsubara, Hyogo Prefecture; Kanaaki Uchiyama, Osaka Prefecture; Masajiro Nakata, Hyogo Prefecture, all of, Japan
[21] Appl. No. 841,159
[22] Filed July 11, 1969
[45] Patented July 20, 1971
[73] Assignee Sumikin Welding Electrode Company Limited
 Amagasaki, Hyogo Prefecture, Japan

[54] CONTINUOUS LAY DOWN ARC WELDING METHOD
26 Claims, 36 Drawing Figs.

[52] U.S. Cl. .................................................. 219/137, 219/130, 219/131 R
[51] Int. Cl. ................................................ B23k 9/00
[50] Field of Search .......................................... 219/73, 75, 76, 130, 131, 137

[56] References Cited
UNITED STATES PATENTS

| 1,953,942 | 4/1934 | Applegate | 219/137 X |
| 2,163,439 | 6/1939 | Sommerville | 219/137 |
| 2,511,426 | 6/1950 | Bienfait et al. | 219/130 |
| 3,005,901 | 10/1961 | King | 219/131 X |
| 3,370,151 | 2/1968 | Normando | 219/131 |

Primary Examiner—J. V. Truhe
Assistant Examiner—C. L. Albritton
Attorney—Laurence R. Brown ABSTRACT: This invention is a continuous lay down arc welding method wherein current supplying points are provided at proper intervals on a connected welding electrode or nonconnected long welding electrode and current supplying apparatus operated by the arc light or arc heat are set so that unmanned welding may be automatically made only by switching the welder.

CONTINUOUS LAY DOWN ARC WELDING METHOD

This invention relates to a welding method wherein welding is made by laying down an arc welding electrode at an angle of 15 to −1 degree with a welding line and automatically feeding an electric current singly or by means of automatic continuous current supplying apparatus at fixed current supplying contact points.

In the conventional manual welding, quasiautomatic welding or semiautomatic welding, as the welding procedure is carried out artificially, it is limited and difficult to further improve the welding efficiency to be higher than today. Further, in such welding methods, the skill of the welders themselves is required, and, as the welders approach the arc generating spots, accidents are likely to happen.

On the other hand, in the continuous laydown arc welding method according to the present invention, the defects of the above mentioned welding methods are obviated, the operation is made automatic and the welding is completed by only laying down a welding electrode along the weld line of an object to the welded and generating an arc. Therefore, an object of the present invention is to provide a welding method wherein, the longer the weld line, the higher the welding efficiency.

In comparing the welding efficiency in the method according to the present invention with those in manual welding, gravity welding and semiautomatic welding, it is found that, in the case of comparing the quantity of weld metal obtained by one welding worker per hour, the efficiency obtained in the method of the present invention is about 10 times as high as in the manual welding, about 3 times as high as in the gravity welding and about 5 times as high as in the semiautomatic welding ($CO_2$ gas welding).

Therefore, the method of the present invention can greatly contribute to the reduction of the construction time. In reducing the number of steps, in such quick work as has been heretofore often required, it is easily possible to make an unmanned operation wherein the welding is completed by only setting arc welding electrodes and automatic continuous current supplying apparatus along the weld lines in the daytime and switching them by a remote control at night. Further, in the reduction of the number of steps, in the conventional welding method, the operation has been made artificially but in the present method, remote control is possible, therefore the workers need not approach the arc generating spots and, it is thus possible to use a large current. Arc welding electrodes of such large diameter as 14 mm. can be used and the number of steps can be greatly reduced.

Further, as the workers need not approach the arc generating spots, they are not likely to be injured and can be relieved of severe heat in summer. Therefore, the present invention is significant from the viewpoint of the environment sanitation. Further, in the method of the present invention, the equipment cost can be reduced to be much lower than in any other semiautomatic or automatic welding method. No skilled welding worker is required as in the past, even unskilled workers can easily well operate the equipment and therefore the effect of the reduction of the labor control cost is more remarkable.

Figure 1:
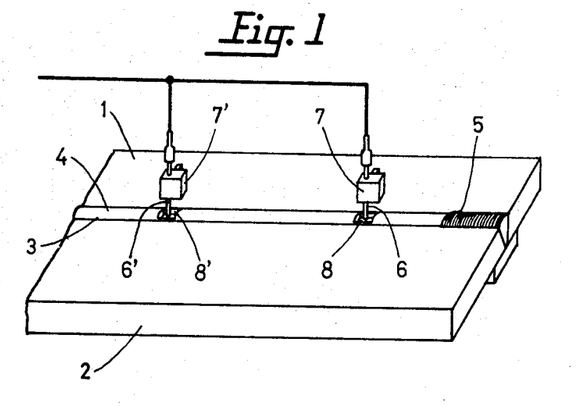
FIG. 1 is a schematic view of an apparatus for working the method of the present invention.

Now, referring to FIG. 1, a groove 3 is formed in the weld zone of two objects 1 and 2 to be welded, a properly connected or single arc welding electrode 4 is laid down on the weld line, an automatic continuous current supplying apparatus 7 is made to sense that an arc light 5 generated from the tip of the arc welding electrode 4 has approached the electrode contact part 6 with the welding electrode 4 and the contact of the electrode 6 is separated from the arc welding electrode 4 as operatively connected with the current supplying apparatus so that the main current may be automatically switched over to the electrode contact part 6' in the next position. The arc welding electrode 4 has such structure as is mentioned later. The arc welding electrode is concaved in some parts to provide several concaves 8 and 8' at proper intervals. The electrodes 6 and 6' of said automatic continuous current supplying apparatus 7 and 7' are fitted respectively in said concaves 8 and 8'.

Figure 2:
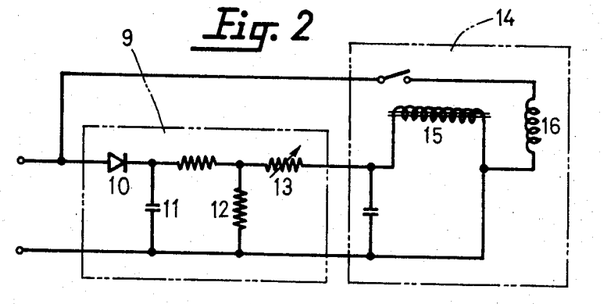
FIG. 2 is a wiring diagram of a photoelectric detection or receiving circuit of the apparatus for working the method of the present invention.
Figure 3:
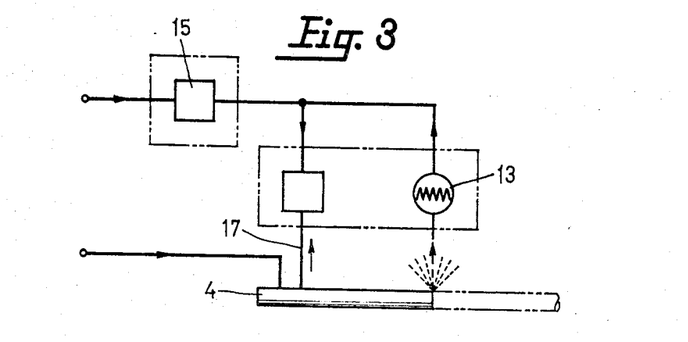
FIG. 3 is an operation diagram showing an intermittent state of a welding current operatively connected with the photoelectric receiving circuit shown in FIG. 2.

The passage of the main current is switched over through a welding current switch by making the arc light of the arc welding electrode generate or vary a current or voltage through such photoelectric receiving means as a photoelectric tube, photoconductor, phototransistor, photodiode or photovoltaic cell. Referring to FIGS. 2 and 3, 9 is a photoelectric receiving means. A direct current rectified by a silicon rectifier 10 is passed to a cadmium sulfide photoconductor 13 through a circuit consisting of a condenser 11 and resistance 12 and its resistance value is increased or decreased by the received photoelectric quantity. 14 is a welding current switch which has a relay 15 operated by the current or voltage value generated or varied by said photoelectric receiving means 9 and a solenoid 16 operatively connected with it. At the time of welding, an arc light is generated from the tip of the arc welding electrode. In such case, the quantity of the arc light is so small that the resistance value of the photoconductor 13 is large and therefore the circuit breaker of the relay 15 does not operate. Thus, though the welding current is being passed, just below the welding end point, the received photoelectric quantity is so large that the resistance of the photoconductor 13 will be small, the relay 15 will operate to cut off the welding current and at the same time a switch bar 17 will be raised by the magnetic force of the solenoid 16 to stop feeding the welding current.

Figure 4:
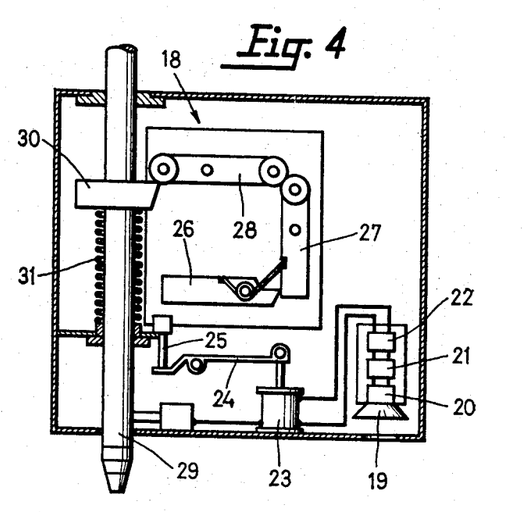
FIG. 4 is a sectional view showing an electrode retracting mechanism having a photoelectric receiving means used in the apparatus for working the method of the present invention.

FIG. 4 shows an embodiment of an electrode retracting mechanism 18 forming a part of an automatic continuous current supplying apparatus utilizing a photoelectric tube. When an arc light is sensed by a photosensitive part 19, a photoelectric tube 20 will operate, a slight current will be amplified by an amplifier 21, a detecting relay 22 will operate and an electromagnetic force will be generated in the relay 23. By this electromagnetic force, a movable lever 24 will be operated to raise a pushup bar 25 so that a lever 26 may be pushed up at one end and a lever 27 engaged with the lever 26 at the other end may be disengaged at one end and, as a result, the lever 27 will be disengaged at the other end from one end of another lever 28, the lever 28 will be disengaged at the other end from a projection 30 provided on an electrode 29, the electrode 29 will rise due to a spring 31 and will separate away from the arc welding electrode and the current will be cut off. These operations shall be further detailed later.

Figure 5:
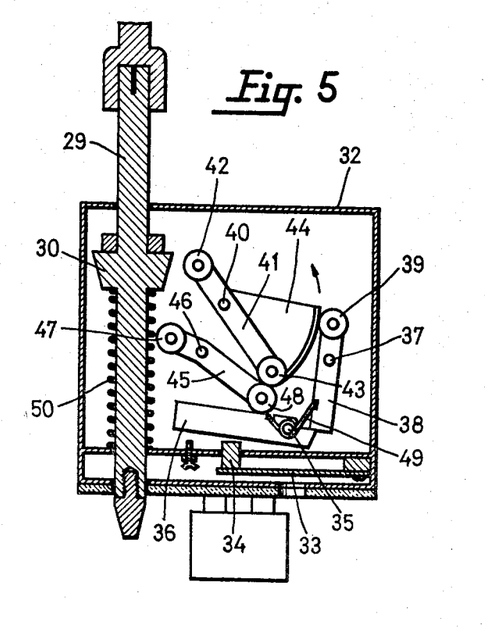
FIGS. 5 and 6 are sectional views showing operating states of an electrode retracting mechanism having a heat receiving means.
Figure 6:
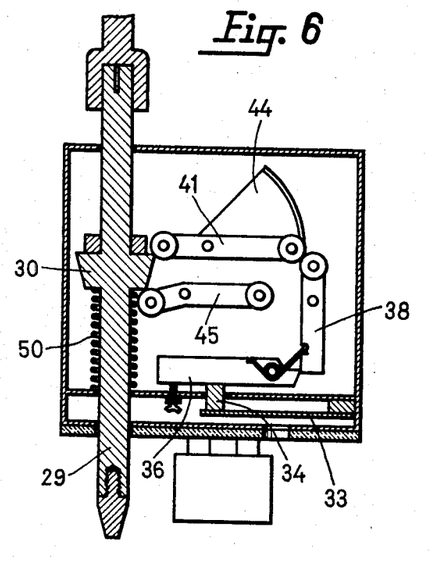

FIGS. 5 and 6 show a continuous automatic current supplying apparatus wherein the arc heat of the arc welding electrode is sensed by a heat receiving means as a temperature around it and the passage of the main current is switched over to an electrode contact part in the next position through an electrode retracting mechanism operatively connected with said heat receiving means. More particularly, the electrode 29 is arranged vertically on one side of a case 32 and the projection 30 is fixed near the middle of said electrode 29. A bimetal 33 is fixed at one end in the bottom of said case 32 and has a pin 34 projected upward at the other end. A lever 36 made swingable with a pivot 35 is arranged at engageable end above said pin 34 and is made engageable at the other end with a vertical lever 38 pivotally mounted with a pivot 37. A roller 39 is provided at the upper end of the vertical lever 38. A lever 41 pivotally mounted with a pivot 40 is provided in the central part of the case 32 and is provided at one end with a roller 42 and at the other end with a roller 43 and segment 44 which is so made as to be always in contact with the roller 39. Below said lever 41 and substantially parallel with it is pivotally mounted a lever 45 with a pivot 46. Said lever 45 is provided at one end with a roller 47 and at the other end with a roller 48. When the levers 41 and 45 are lowered, the respective rollers 43 and 48 will be in contact with each other. Further, the rollers 42 and 47 of the levers 41 and 45 can come into contact respectively with the upper surface and lower surface of the projection 30 of the electrode 29. A spring 49 is engaged between the lever 36 and vertical lever 38. Now, when the electrode 29 is in the raised position, the respective parts will occupy such positions as are shown in FIG. 5. When the electrode 29 is pushed down with respect to the welding rod as shown in FIG. 6, the roller 43 of the lever 41 and the roller 49 of the vertical lever 38 will come into contact with each other, the lever 36 will engage at the tip with the inside of the lever 38, the roller 42 of the lever 41 will come into contact with the upper surface of the projection 30 of the electrode 29 and the electrode 29 will be prevented from rising by the action of a spring 50.

When the arc approaches the continuous automatic current supplying apparatus, the bimetal 33 will operate to raise the pin 34, the lever 36 will be raised at one end and will separate at the tip from the inside of the vertical lever 38 so as to be in such state as is shown in FIG. 5, the roller 39 at the upper end of the vertical lever 38 will be disengaged from the roller 43 and the lever 41 will fall by its own weight and will be guided by the segment 44 and roller 39. Therefore, the roller 42 of the lever 41 will separate from the projection 30 of the electrode 29 and said electrode 29 will rise due to the force of the spring 50 to cut off the main current.

Figure 7:
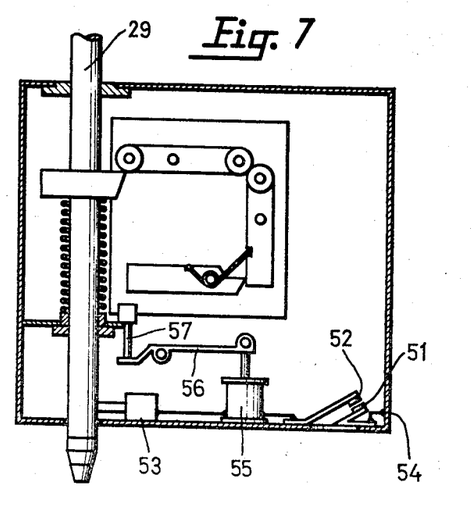
FIG. 7 is a sectional view of an embodiment in which a thermocouple is used for the heat receiving means shown in FIGS. 5 and 6.

FIG. 7 is of an embodiment showing an electrode retracting mechanism utilizing a thermocouple. When heated, a thermocouple 51 will come into contact with a fixed contact point 52, an electric current will flow from a current receiving part 53 to an earth 54, a relay 55 will produce an electromagnetic force and a movable lever 56 will operate to push up the electrode by the same means as is explained in the preceding embodiment of FIG. 4 through a pushup bar 57 so that the welding current may be cut off.

Figure 8:
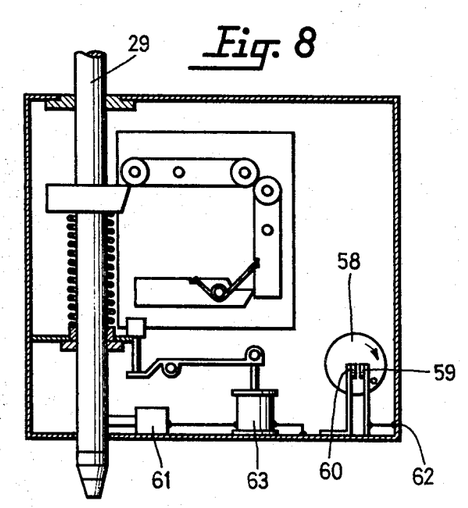
FIG. 8 is a sectional view showing an electrode retracting mechanism using a timer.

FIG. 8 shows an embodiment of an electrode retracting mechanism using a timer so that the time may be set by the melting speed of the arc welding electrode. By adjusting the graduation of the timer so that, when an arc generated from the tip of the arc welding electrode has approached the electrode contact point of the welding electrode, the arc may be cut off, the passage of the main current is switched over to the electrode part in the next position. That is to say, when the timer 58 is set at the welding speed of the arc welding electrode, with the operation, a fixed contact point 60 will contact the movable contact 59, an electric current will flow from the current receiving part 61 to an earthing part 62 and a relay 63 will operate to push up the electrode 29 in the same manner as in the preceding example.

Figure 9:
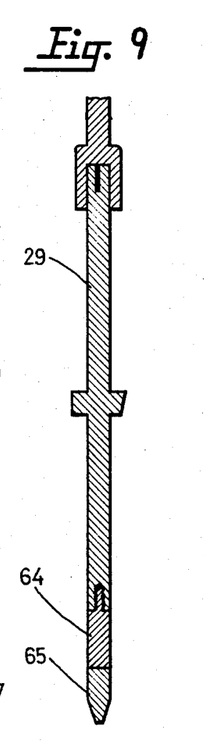
FIG. 9 is a sectional view showing an embodiment of an electrode used in the method of the present invention.
Figure 10:
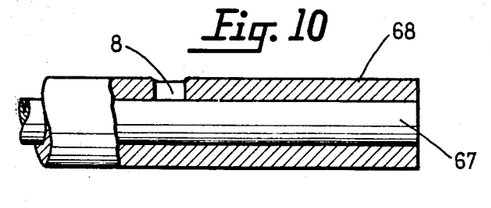
FIG. 10 is a longitude sectional view of an arc welding electrode to be used in the method of the present invention.
Figure 11:
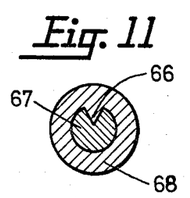
FIG. 11 is a cross-sectional view of FIG. 10.
Figure 12:
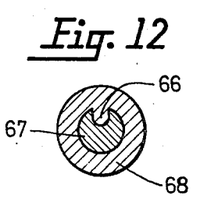
FIGS. 12 and 13 are cross-sectional views showing modifications of core wire of an arc welding electrode.
Figure 13:
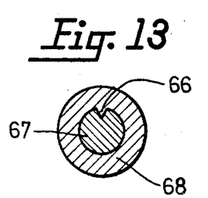

FIG. 9 is a view showing the embodiment of an electrode for carrying out the method of the present invention. When an arc generated from the tip of the arc welding electrode approaches the electrode contact point of the welding electrode, a conductor piece 65 interposed between the tip 64 of the electrode 29 and the partially stripped core wire of the arc welding electrode will be melted and removed so that the passage of the current between the electrode contact point and the arc welding electrode may be cut off. The conductor piece 65 is made preferably of a metal having a low melting point (such as 400° to 1000° C.) and is effective for welding in any position except a flat position.

The arc welding electrode to be used in the method according to the present invention shall be explained in the following. As shown in FIGS. 10 to 13, it is an arc welding electrode in which a wire 67 provided with a gouge 66 of a V or U-shaped cross section in the wire drawing direction is made with a core and is covered with a flux 68 on the outer periphery. A round core wire has been used for a conventional covered arc welding electrode. However, when the welding angle is small, the arc length will naturally become larger, therefore the arc will become unstable, the spatter will increase and the bead will be disturbed or the defect of an incomplete penetration will be likely to occur. Therefore, in the present invention, the above mentioned defects can be eliminated and, in welding, if the core wire is placed so that the longitudinal gouge may be always on the side reverse to the welding surface, the covering will be later in melting on the longitudinal gouge side than on the side of welding surface, therefore the direction of the arc will deviate to the side of welding surface and will be fixed and the state of the arc will be stabilized very much.

Further, the arc welding electrode according to the present invention is covered with a flux mixed with a proper amount of a magnetic powder of an oxide on the outer periphery provided with a longitudinal gouge in the lengthwise direction of the core wire so that the flux may be positively magnetically deposited on the base metal and the directivity of the arc may be further promoted. In the conventional laydown arc welding method, a metallic mold made of copper or sand is placed around the welding electrode, auxiliary tools are required and therefore the welding operation has been complicated and inefficient. On the other hand, according to the present invention, the arc welding electrode itself has a magnetic attraction to the base metal and therefore the above mentioned auxiliary tools are not required.

Further, a proper amount of a magnetic powder of a metal or oxide is mixed in the flux covering the gouged core wire of the arc welding electrode according to the present invention so that the magnetic attraction may be increased and a perfect magnetic attraction to the objects to be welded may be possible not only in the case of a flat position welding and horizontal fillet welding but also in the case of a horizontal position welding, vertical position welding and overhead position welding. For example, powders of $BaO\ 6Fe_2O_3$ and a permanent magnet are used respectively for such oxide magnetic powders of an oxide and metal.

Their mixing examples are shown in table I and their attractions and the mechanical properties of the weld materials are shown in Table 2.

TABLE 1

| Welding materials (6.0 mm.) | SiO₂ | TiO₂ | Na₂O | K₂O | Al₂O₃ | CaCO₃ | Fe-Mn | Fe | BaO·6Fe₂O₃ | Permanent magnet powder |
|---|---|---|---|---|---|---|---|---|---|---|
| A | 35 | 10 | 2 | 2 | 4 | 19 | 20 | | 10 | |
| B | 38 | 8 | 2 | 2 | 3 | 8 | 19 | | 20 | |
| C | 22 | 2 | 1 | 1 | 1 | 7 | 16 | | 50 | |
| D | 40 | 10 | 4 | | | 15 | 18 | | | 10 |
| E | 35 | 10 | 1 | | | 16 | 15 | | | 20 |

TABLE 2

| Sample welding | Welding series | Welding current (a.) | Attraction (kg./m.) | Tensile strength (kg./mm.²) | Elongation (percent) | Impact value (kg.-m.)0°C | Welding efficiency and welding speed (g./min.) |
|---|---|---|---|---|---|---|---|
| A | 1 electrode | 250 | 0.15 | 49.6 | 34.5 | 9.6 | 48 |
|   | 5 electrodes | 1,250 | | 48.7 | 32.0 | 4.3 | 232 |
| C | 1 electrode | 250 | 0.40 | 49.9 | 29.0 | 8.4 | 47 |
|   | 5 electrodes | 1,250 | | 49.3 | 27.0 | 4.1 | 229 |
| D | 1 electrode | 250 | 0.11 | 54.6 | 27.5 | 8.2 | 49 |
|   | 5 electrodes | 1,250 | | 53.6 | 28.0 | 3.7 | 241 |
| E | 1 electrode | 250 | 0.23 | 57.5 | 28.5 | 7.2 | 49 |
|   | 5 electrodes | 1,250 | | 56.7 | 26.0 | 3.5 | 238 |

Figure 14:
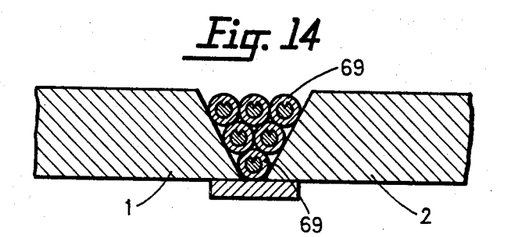
FIG. 14 is a sectional view showing a plurality of welding electrodes as bound together.
Figure 15:
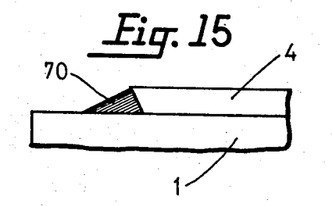
FIGS. 15 to 17 are views showing directions of an arc between an arc welding electrode and an object to be welded.
Figure 16:
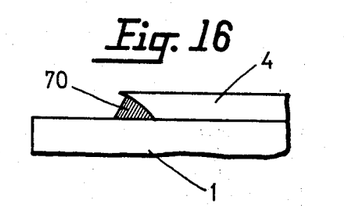

In order to improve the welding efficiency, a plurality of arc welding electrodes 69 may be properly bound and set in a groove as shown in FIG. 14 and the objects 1 and 2 to be welded and the arc welding electrodes 69 may be magnetically attracted to each other so that the arcs from the respective arc welding electrodes may be constructed at one spot to remarkably increase the quantity of the weld metal. The results of measuring such quantities of weld metals are shown in Table 3.

trode. 70 is a state of direction of the arc to the object to be welded. When the core wire has the gouge made shallow and is covered with a flux of a conventional laydown arc welding electrode, it will have such directivity of the arc as is shown in FIG. 15. But, when the same core wire is covered with a flux mixed with a large amount of a high melting point substance powder, it will have such sufficient directivity of the arc as is shown in FIG. 16 and will not be different at all from the said laydown arc welding electrode (FIGS. 11, 12) using a core of a deep gouge.

TABLE 3

| Example No. | Core Wire Diameter (mm) | V-Gouge From (mm) | Silica | Rutile | Sodium Oxide | Potassium Oxide | Alumina | Calcium Carbonate | Magnesium Carbonate | Iron Powder | Ferromanganese | Barium Ferrite | Wollastonite | Total |
|---|---|---|---|---|---|---|---|---|---|---|---|---|---|---|
| 1 | 7 | V 1.0/0.1 | 25 | 3 | 2 | 2 | 2 | 5 | - | 8 | 13 | 40 | - | 100 |
| 2 | 7 | ditto | 20 | 3 | 2 | 2 | 2 | - | 13 | 10 | 13 | 15 | 20 | 100 |
| 3 | 7 | ditto | 20 | 3 | 2 | 2 | 2 | 15 | - | 10 | 13 | 33 | - | 100 |
| 4 | 7 | ditto | 20 | 3 | 2 | 2 | 2 | - | 30 | 10 | 13 | 18 | - | 100 |
| 5 | 7 | ditto | 20 | 3 | 2 | 2 | 2 | 20 | - | 9 | 13 | 29 | - | 100 |
| 6 | 7 | ditto | 20 | 3 | 2 | 2 | 2 | - | 35 | 9 | 13 | 14 | - | 100 |
| 7 | 7 | ditto | 18 | 3 | 2 | 2 | 2 | 60 | - | - | 13 | - | - | 100 |
| 8 | 7 | V 2.5/0.2 | 25 | 3 | 2 | 2 | 2 | 5 | - | 8 | 13 | 40 | - | 100 |

Figure 17:
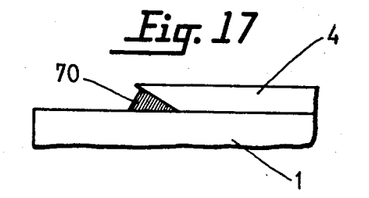

In the arc welding electrode according to the present invention, in order to further increase the directivity of the arc, a large amount of such high melting point substance as, for example, a powder of CaO, MgO or alumina can be used in the covering flux. Even if the gouge in the core wire used in such welding electrode is made shallow, a sufficient directivity of the arc can be retained. FIGS. 15 to 17 are of such experiments. 1 is an object to be welded. 4 is an arc welding elec- With respect to the example of the present invention, the above mentioned Table 3 shows mixing examples of covering materials and Table 4 shows welding conditions and various performances. Even if the gouge of the core wire is shallow, in the range of 20 to 60 percent potassium carbonate, 13 percent to 30 percent magnesium carbonate or less than 40 percent of a magnetic powder of an oxide and/or metal, the directivity of the arc will be favorable as shown in FIGS. 16 and 17.

TABLE 4.—PERFORMANCE TEST RESULTS

| | Comparison of welding workability | | | | Weldability | | Welding current (A) in a. |
|---|---|---|---|---|---|---|---|
| | Directivity of arc | State of slag | Amount of spatter | Bead form | Penetration | X-ray performance | |
| Example: | | | | | | | |
| 1 | Bad | Bad | Large | Bad | Shallow | Bad | 270 |
| 2 | Good | Good | Small | Good | Good | Good | 270 |
| 3 | Rather bad | Rather bad | Large | Bad | Shallow | do | 270 |
| 4 | Good | Good | Small | Good | Good | do | 270 |
| 5 | do | do | do | do | do | do | 270 |
| 6 | Rather bad | Rather bad | Rather large | do | Shallow | Rather bad | 270 |
| 7 | Good | Good | Small | do | Good | Good | 270 |
| 8 | do | do | do | do | Ordinary | do | 270 |

Figure 18:
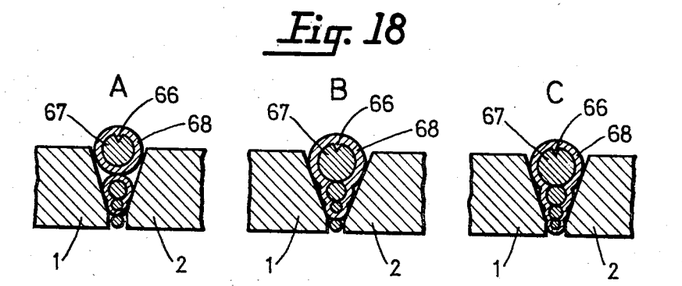
FIGS. 18 and 19 are sectional views showing a covered core wire bound type welding electrode.
Figure 19:
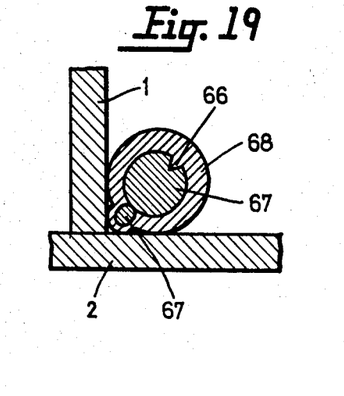
Figure 20:
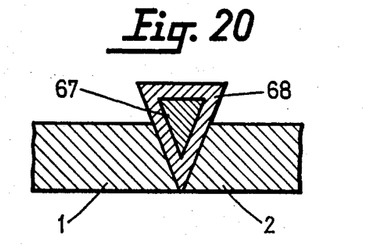
FIGS. 20 to 22 are sectional views showing embodiments of a core wire fitted to the shape of a groove in objects to be welded.

FIGS. 18 and 19 show bound covered core wire-type arc welding electrodes made by binding, enclosing and covering a plurality of core wires in the present invention. By using such bound covered core wire-type arc welding electrode, a butt joint welding or fillet welding can be made with a single pass, the welding efficiency is remarkably high, there are no such defects as a slay trap and incomplete penetration as compared with the case of a multilayer welding and further, in the fillet welding, a sufficient penetration can be obtained and an effective strength can be attained.

Figure 21:
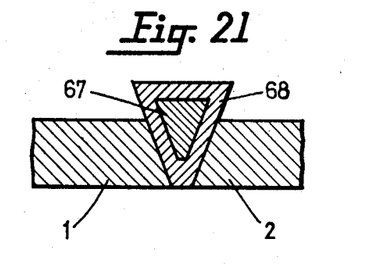
Figure 22:
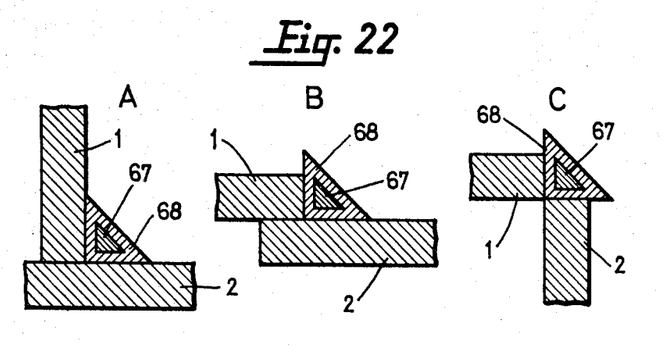

Shown in FIGS. 21 and 22 are cross sections of core wires 67 each fitted to the groove form of objects 1 and 2 to be welded and covered with a flux 68 of the same form. With them, efficient and favorable welding results are obtained in a butt joint welding or fillet welding.

Figure 23:
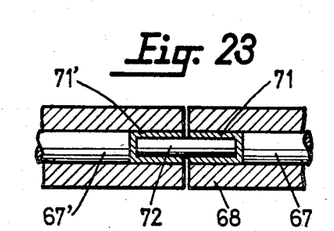
FIGS. 23 to 25 are sectional views showing embodiments of a method of connecting the welding electrodes.
Figure 24:
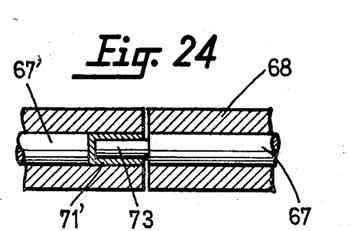
Figures 25, 26, 27, 28, 29, 30, 31:
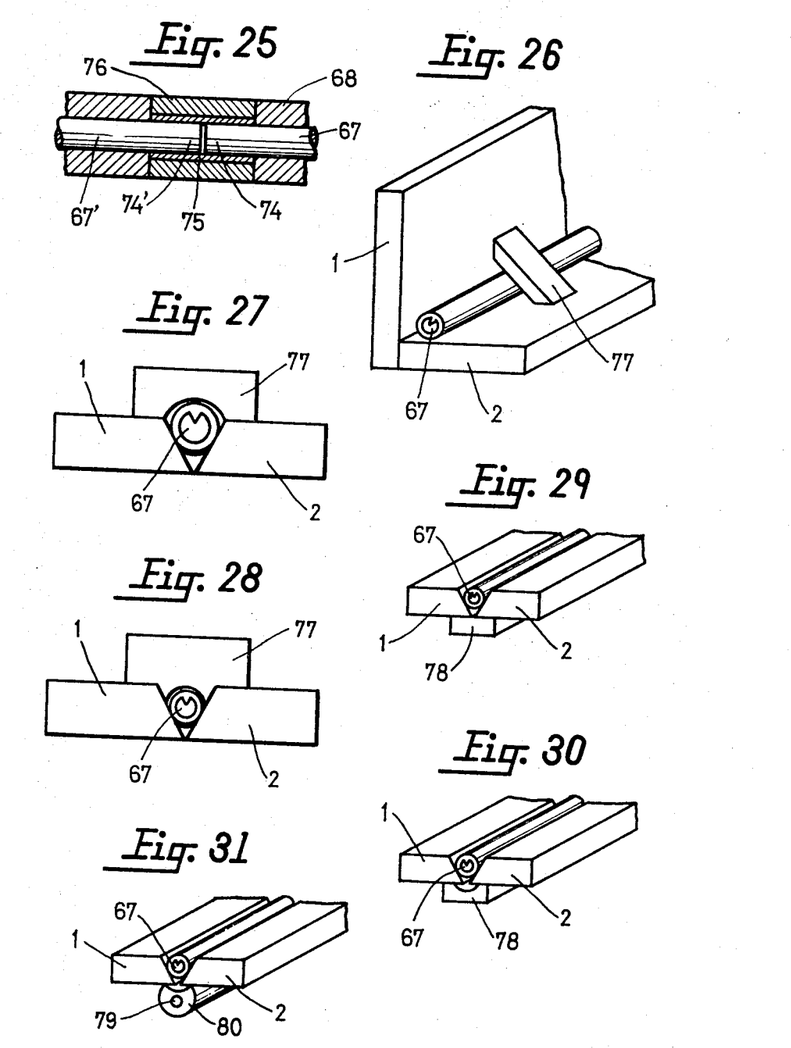
FIGS. 26 to 28 are views showing the embodiments of a weight to be used for an arc welding electrode.
FIGS. 29 to 36 are perspective views showing embodiments of a backing material.

FIGS. 23 to 25 show cases of carrying out a continuous automatic welding wherein the weld line is so long that a plurality of arc welding electrodes are jointed together. The respective welding electrode core wires 67 and 67' are provided with concaves 71 and 71' at respective ends and have an inner core 72 fitted in them so as to be connected with each other. Or one 67 of the two arc welding electrode core wires is provided with an extension 73, the other core wire 67' is provided with a concave 71' and said extension 73 is fitted in the concave 71' to connect them. Or both core wires 67 and 67' are provided respectively with exposed portions 74 and 74' at the tips and these exposed portions are fitted into a joint made of a thin-walled pipe 75 covered with a flux 76 to connect the core wires. Thus, such junction point of beads as in the conventional manual welding or gravity welding will be produced in the welding part, therefore the appearance will be beautiful and no pit will be produced on the surface or no blow hole will be produced within.

So far, due to the curving of the objects to be welded, the irregularity of the underdeposited beads or the tack welding part, the laid welding electrode has floated up, the arc has become long during welding and therefore, by the flow of the slag, the appearance of the beads has been impaired. But, in the welding method according to the present invention, in order to prevent such floating up of the welding electrode, a weight of copper or a copper alloy is used. FIGS. 26 to 28 show embodiments of such weight 77. In the horizontal fillet welding, vertical position welding, horizontal position welding and overhead position welding, in case the length of the weight is too large, the direction of the arc in the part to be pressed by the weight will vary, therefore the fluidity of the slag will also vary and the bead will be disturbed. From the results of experiments by limiting the length of the weight in the welding direction, it has been found that, when the weight is 5 to 50 mm. long, the bead form will be least disturbed. Further, if a permanent magnet or electromagnet is fixed to the surface of said weight to be in contact with the objects to be welded, not only in the horizontal fillet welding but also in the horizontal position welding, vertical position welding and overhead position welding, the weight will be magnetically attracted to the objects to be welded, therefore the welding electrode having floated up will be strongly pressed down, the arc will be kept short and there will be an advantage of forming favorable beads.

The present invention is further to provide a backing material for the one side welding in a butt joint welding. In the conventional one side welding, in order to attain back wave beads in the first layer of the butt welding, a backing material for lining is supported from below on the back of the root of the welding groove to carry out the welding. However, many steps are required to fit the backing material by such supporting device. In the present invention, the back of the groove of objects to be welded may be magnetically fitted with a magnetic backing material for one side welding made by compressing and molding a magnetic powder of an oxide, magnetic powder of a metal or magnetic powder of a mixture of them.

The above mentioned backing material is made by mixing in a range of less than 80 percent one or more of such high melting point oxides as alumina, magnesium oxide and asbestos, such powders as of copper iron and iron alloys and such deoxidizers as ferromanganese, ferrotitanium and ferrosilicon in a magnetic powder of such oxide as $BaO_6Fe_2O_3$ or cobalt ferrite. If such backing material is added, the weldability will improve and welding beads having no defect will be obtained. If such flux, metal powder or alloy powder is increased, the mixing rate of the magnetic powder will reduce and the magnetic attraction will tend to become weak. Therefore, it is proper to limit such additives to be less than 80 percent.

Figure 32:
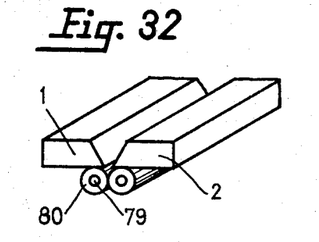
Figure 33:
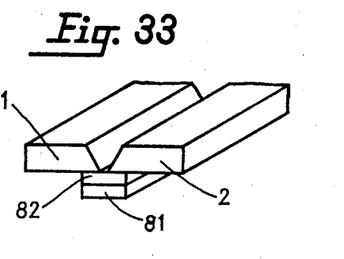
Figure 34:
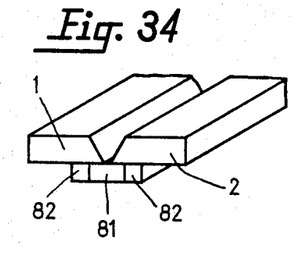
Figure 35:
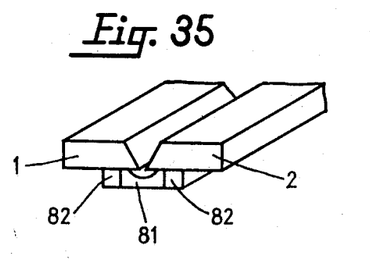
Figure 36:
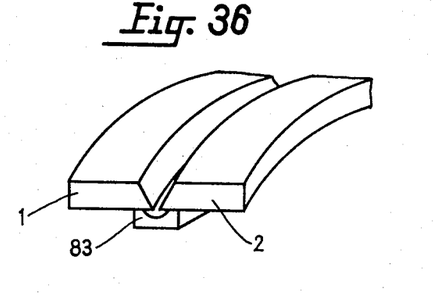

FIGS. 29 to 36 are views showing embodiments of the above mentioned one side welding backing material. FIGS. 29 and 30 show solid backing materials 78. FIGS. 31 and 32 show backing materials 80 covering core wires 79. FIG. 33 shows a backing material made by solidifying and depositing a magnetic substance powder 82 on one surface of a lining member 81. FIGS. 34 and 35 show backing materials made by depositing a magnetic substance powder 82 on both sides of a lining member 81. In case the groove of the objects to be welded is stepped or curved, a backing material 83 made by dispersing a magnetic powder in a rubber strip or mixing and molding a magnetic substance powder with a thermoplastic or thermosetting resin is freely magnetically deposited on the back of the groove.

What we claim is:

1. A continuous laydown arc welding method comprising steps of laying down a welding electrode with a welding tip on a weld line, selectively physically moving one of several current carrying electrode contact elements into electrical contact with said electrode at a series of positions along the electrode away from the tip to provide welding current, sensing an arc generated from the tip of said welding electrode and then moving selected ones of said elements into and out of contact in response to said arc sensing signal to cut off the welding current from an electrode contact element and to switch over the passage of the welding current to a different electrode contact element in another position.

2. A method according to claim 1 wherein the arc provides light and the arc is photoelectrically sensed when the arc approaches a particular electrode contact element and the contact of that element is thereby separated from the welding electrode.

3. A method according to claim 1 wherein the arc heat is sensed at each electrode contact element position to indicate the approach of the arc at the tip of the welding electrode and the electrode contact element to each other to cut off the passage of the current, and automatically contacting an electrode contact element with the welding electrode in a further of said positions.

4. Apparatus for continuous laydown arc welding along a welding electrode line having a series of electrode contact element parts carrying welding current positioned along the welding electrode line, and means selectively moving the elements into and out of contact with the welding electrode, comprising sensing means for sensing the arc generated from the top of the welding electrode, and a circuit including an electrode retracting mechanism operable in response to said sensing means in the generated arc when it has approached the welding electrode contact part to retract said electrode and remove the welding current.

5. An apparatus according to claim 4 comprising a hear receiving means for making a bimetal sense the arc generated from the tip of a welding electrode and an electrode retracting mechanism including a link mechanism and spring mechanism whereby, when the generated arc heat has approached the welding electrode and electrode contact part, said electrode retracting mechanism is operated.

6. Apparatus according to claim 4 wherein the sensing means comprises photodetection means detecting and amplifying the arc light, an electromagnet, an electrode retracting mechanism and means responsive to the detected light to actuate said electromagnet and operate said electrode retracting mechanism.

7. Apparatus according to claim 4 wherein said sensing means causes an electromotive force to be induced through a thermocouple from the arc heat, an electrode retracting mechanism and amplifier and means operable to actuate said electrode retracting mechanism responsive to said electromotive force when the arc heat indicates the arc is nearing the detecting means.

8. A continuous laydown automatic arc welding method according to claim 1 wherein the arc is sensed by selecting a time limit determined by a predetermined welding speed of a welding electrode, separating the contact of said electrode contact element from the welding electrode responsive to expiration of said time limit, and starting the passage of welding current at the electrode contact part of a further said position.

9. A continuous laydown automatic arc welding method with a series of contact elements movable into contact to pass welding current at several positions along a welding electrode, comprising the steps of sensing the arc generated from the tip of a welding electrode as it approaches an electrode contact part in contact with the welding electrode, cutting off the passage of current to said electrode contact part and establishing welding current by moving an electrode contact part in a further contact element position into contact with the welding electrode.

10. Apparatus for continuous laydown automatic arc welding wherein an elongated welding electrode has an arc generated at the tip thereof, comprising in combination, a series of stations along the welding electrode at separated positions each having a contact element for contacting the welding electrode and passing welding current thereto, means sensing the arc, and means responsive to sensing of the arc for removing welding current from one contact element as the arc nears its position and automatically passing welding current through another contact element at an unwelded position along the welding electrode.

11. Apparatus according to claim 10 wherein the means for sensing the arc comprises a portion of the weld current conductor path in said contact element fusible from the heat of the arc as it approaches the position of said contact element and wherein the melting point of the fusible portion of said conductor path is 400° to 1,000° C.

12. Apparatus according to claim 27 wherein a laydown welding electrode to be used comprises a wire core provided with a gouge of a proper size in the wire drawing direction which wire has thereon a cover of class of materials including magnetic powder of an oxide, a magnetic powder of at least one metal wherein the cover is magnetized.

13. A lay down welding electrode according to claim 12 wherein a high melting point substance powder is mixed in the covering to increase the directivity of the arc.

14. A lay down welding electrode according to claim 13 wherein the covering agent is calcium carbonate, magnesium carbonate, a magnetic powder of a metal and the mixing weight rate is 20 percent to 60 percent calcium carbonate, 13 percent to 30 percent carbonate and less than 40 percent of the magnetic powder.

15. Apparatus according to claim 10 wherein the work to be welded has a groove wherein the welding electrode comprises a bound type laydown welding electrode wherein a plurality of covered arc welding electrodes are laid down in said groove and means fixing them to materials to be welded and the welding electrode contact element by utilizing a magnetic attraction.

16. A bound covered core wire type laydown welding electrode according to claim 15 wherein the welding electrodes provide a plurality of core wires bound, enclosed and covered.

17. A laydown welding electrode according to claim 10 wherein the workpiece to be welded has a weld zone with a cross section of noncircular shape and the welding electrode comprises a core wire fitted to the form of the cross section of the weld zone.

18. A laydown welding electrode according to claim 10 wherein the welding electrode comprises a series of segments having a core wire wherein a concave hole is made at each end of the core wire of each welding electrode segment and many welding electrode segments are connected through inner cores.

19. A laydown welding electrode according to claim 18 wherein the core wire of each welding electrode is provided with convex and concave parts at the respective ends to connect the core wires.

20. A laydown welding electrode according to claim 18 wherein each welding electrode is provided with an exposed core wire part at each end and such exposed core wire parts are inserted into a joint made by covering a thin-walled pipe with a flux to connect the welding electrodes.

21. Apparatus as defined in claim 10 having a work piece, including a backing material on one side of the workpiece opposite the welding electrode comprising a material made by compressing, molding, and magnetizing a magnetic powder.

22. A backing material according to claim 21 wherein less than 80 percent of at least one of a flux, metal powder and alloy powder is added to a magnetic powder.

23. A backing material according to claim 21 including a liner member wherein a backing material is deposited on at least one surface of said lining member.

24. A backing material for one side welding according to claim 21 wherein the magnetic powder is dispersed in a body molded of a resin.

25. Apparatus as defined in claim 10 including a work piece upon which the welding electrode is disposed, and a weight disposed to hold the welding electrode in place made of an alloy material consisting mostly of copper and 5 to 50 mm. thick in the welding direction.

26. A weight according to claim 25 wherein a magnet is fixed to the side of contact with the objects to be welded.